March 3, 1942.  W. R. FREEMAN  2,275,255
FLUID PRESSURE BRAKING SYSTEM
Filed Jan. 31, 1941
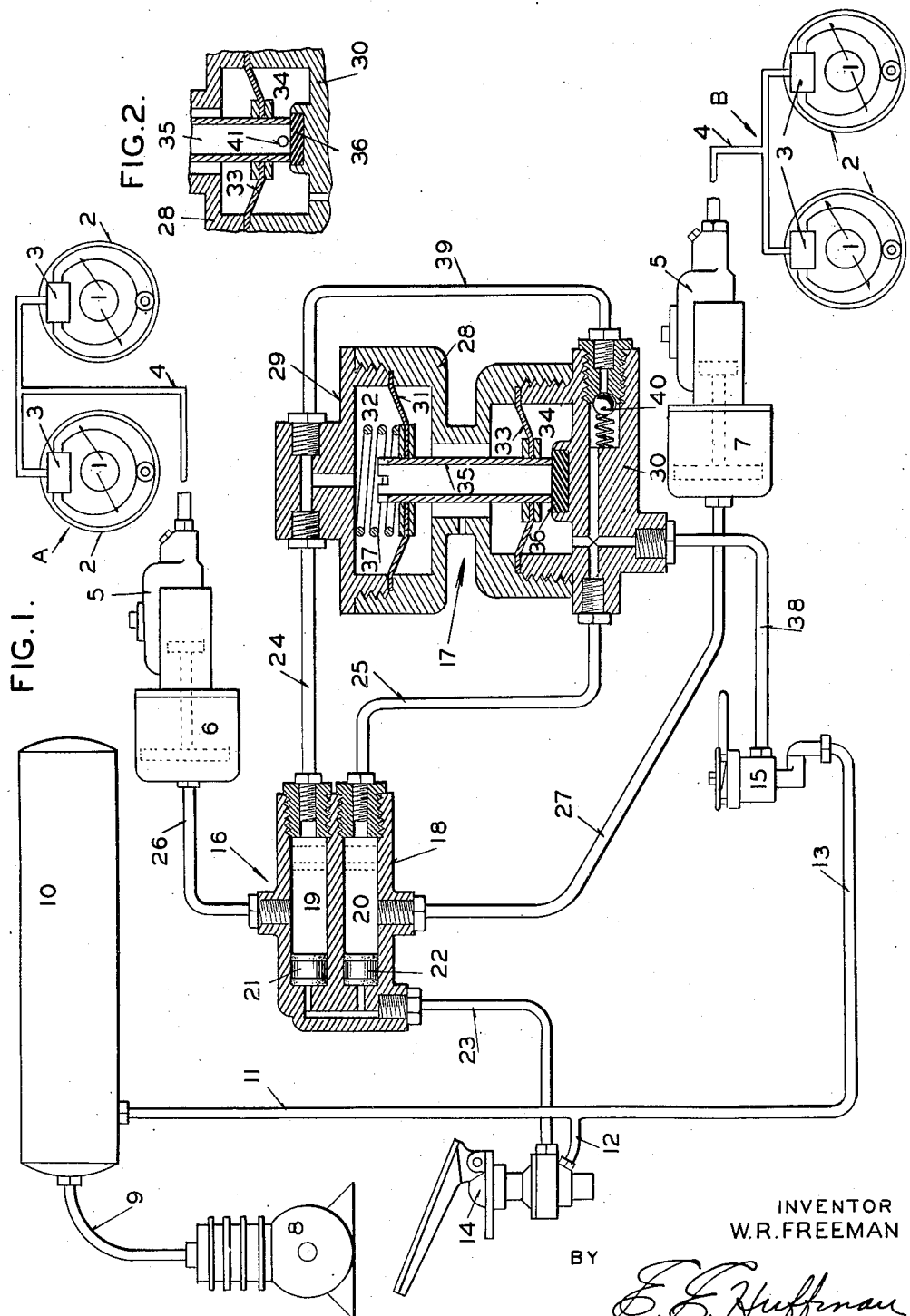
INVENTOR
W. R. FREEMAN
BY
E. E. Huffman
ATTORNEY Patented Mar. 3, 1942

2,275,255

UNITED STATES PATENT OFFICE 2,275,255

FLUID PRESSURE BRAKING SYSTEM

Walter R. Freeman, Clayton, Mo., assignor to Wagner Electric Corporation, St. Louis, Mo., a corporation of Delaware Application January 31, 1941, Serial No. 376,806

20 Claims. (Cl. 188—3)

My invention relates to brakes and more particularly to a fluid pressure actuating system for the brakes.

One of the objects of my invention is to provide a fluid pressure system for a plurality of brakes which will permit either all the brakes to be applied with equal fluid pressure, or some of the brakes to be applied with a different fluid pressure than other of the brakes.

Another object of my invention is to so construct a fluid pressure braking system for a plurality of brakes that the brakes can be controlled by separate operator-operated means and in such a manner that when one operator-operated means is employed, all of the brakes will be actuated by equal fluid pressure and when the other operator-operated means is employed some of the brakes will be applied with a different fluid pressure than other of the brakes.

Still another object of my invention is to provide an improved differential valve for a fluid pressure actuated braking system which will cause certain brakes to be applied with a different fluid pressure than other brakes.

Another object is to so construct this valve that it will permit the fluid pressure to equalize after the brakes have been initially applied.

A more specific object of my invention is to produce an improved air pressure-actuated braking system for a tractor trailer combination which can be controlled either by foot or by hand.

Other objects of my invention will become apparent from the following description taken in connection with the accompanying drawing in which Figure 1 is a schematic view of parts being shown in section of a tractor trailer braking system embodying my invention; and Figure 2 is a view showing a modification of the differential valve means.

Although I have shown my invention as embodied in an air pressure-actuated tractor trailer braking system, it is as an example only since the invention may be embodied in other fluid pressure braking systems when it is desired to obtain the same or similar results.

Referring to Figure 1 in detail, the tractor brakes are shown at "A" and the trailer brakes at "B", two braking assemblies for each vehicle only being shown. Both the tractor and trailer brakes are hydraulically-actuated and, as shown, each brake assembly comprises brake shoes 1 capable of being moved into engagement with the drum 2 by a motor 3. The motors of each set of brakes are connected by conduit means 4 to a master cylinder device 5. The master cylinder of the tractor brakes is adapted to be operated by an air power cylinder 6 and the master cylinder of the trailer brakes is adapted to be operated by an air power cylinder 7.

On the tractor vehicle there is provided an air compressor 8 which is connected by a pipe 9 to maintain air under pressure in a storage tank 10. A pipe 11 leads from the tank to branch pipes 12 and 13, the former connecting with a foot valve 14 of known construction, and the other with a hand valve 15 of known construction, both of which are mounted in the operator's compartment of the tractor. Also on the tractor vehicle are two valves generally indicated by the numerals 16 and 17, the former being a double two-way valve and the latter being my novel differential valve.

The double two-way valve comprises a casing 18 having two parallel cylinders 19 and 20 in which are mounted freely slidable pistons 21 and 22 respectively. One end of each cylinder is connected to the foot valve 14 by a pipe 23. The other end of the cylinder 19 is connected to pipe 24 and the other end of cylinder 20 is connected to a pipe 25, both pipes being connected to the differential valve to be hereinafter described.

Leading from the central part of cylinder 19 is a pipe 26 which places said cylinder in communication with the power cylinder 6 for the tractor brakes and leading from the central part of cylinder 20 is a pipe 27 which places said cylinder in communication with the power cylinder 7 of the trailer brakes.

The differential valve 17 comprises an hourglass shaped casing 28 closed at its ends by upper and lower plugs 29 and 30. The plug 29 clamps the periphery of a diaphragm 31 to the casing to provide an upper chamber 32, and the plug 30 clamps the periphery of the diaphragm 33 to the casing to provide a lower chamber 34. The central portions of both of these diaphragms are secured to a tube 35 which is capable of placing the chambers in communication with each other. The lower end of the tube cooperates with a rubber seat 36 carried by plug 30 and is biased to normally engage this seat by a light spring 37. The upper chamber 32 is in constant communication with pipe 24 previously referred to, and the lower chamber 34 is in constant communication with pipe 25 previously referred to. Also, constantly communicating with the lower chamber 34 and the pipe 25 is a pipe 38 leading from the hand valve 15. The pipe 24 can also communicate with pipe 38 by way of a pipe 39 and a check valve 40, said check valve preventing air under pressure from flowing by way of pipes 38 and 39 to pipe 24.

The diaphragm 31 of the differential valve has a greater area than the diaphragm 33. The difference between these areas may be varied in order to obtain the desired ratio between the pressures transmitted in pipes 24 and 25 as will hereinafter become apparent.

In operation, when the foot valve 14 is actuated to permit air pressure to pass from the storage tank to pipe 23, the pistons 21 and 22 will take positions in the right hand end of their respective cylinders as shown in dotted lines. The pipes 26 and 27 will now be in communication with pipe 23 and air under pressure will pass to the power cylinders 6 and 7 on tractor and trailer vehicles respectively. The same air pressure will be effective in both the power cylinder and, therefore, the tractor and trailer brakes will be applied with equal pressure by the master cylinders provided, of course, said master cylinders are the same size and the fluid motors 3 are the same size. When the pistons are in the right end of the cylinder, communication with pipes 24 and 25 is cut off.

When hand valve 15 is operated the pipe 38 will be placed in communication with the storage tank and air under pressure will be admitted to the chamber 34 of the differential valve and to the pipe 25 leading to cylinder 20 of the double two-way valve 16. This will cause piston 22 to be moved to the left end of cylinder 20 and thereby place the pipe 27 in communication with pipe 25. Air pressure will then be effective in the power cylinder 7 to actuate the trailer brakes, said air pressure being of the same pressure as that admitted by the hand valve. The air pressure effective in chamber 34 of the differential valve will act upon the diaphragm 33 and raise the tube 35 from seat 36, thus permitting fluid to flow through tube 35 to chamber 32 and then to pipe 24. This air pressure will cause piston 21 to be moved to the left end of cylinder 19 and thereby place pipe 26 in direct communication with pipe 24 whereby air under pressure is effective in the power cylinder 6 to actuate the tractor brakes.

As soon as the air pressure in chamber 32 reaches such a value that it will by acting on the diaphragm 31 move tube 35 downwardly to cause it to reengage seat 36, air pressure will no longer increase in the power cylinder 6 of the tractor. Since the diaphragm 31 is of greater area than diaphragm 33, the lower end of the tube will be seated before the pressure built up in chamber 32 is as great as that in chamber 34 (also that effective in the power cylinder 7 of the trailer brakes). Thus if the hand valve is opened to place air in the trailer power cylinder 7 having a pressure of twenty pounds per square inch of pressure, the air pressure which will be effective in the tractor power cylinder 6 is of a value less than twenty pounds per square inch since the passage of air through tube 25 will be cut off before the air pressure in cylinder 6 reaches twenty pounds per square inch due to the difference in areas between the diaphragms. If diaphragm 33 has, for example, an area one-half the size of diaphragm 31, then the air pressure in the power cylinder 6 will be only ten pounds per square inch, this example, of course, disregarding the pressure of spring 37 which is only of sufficient strength to merely bias the end of the tube into engagement with seat 36.

If the hand valve should be opened to admit 30 pounds per square inch of air pressure to the power cylinder 7 of the trailer brakes, only fifteen pounds will be admitted to power cylinder 6 of the tractor brakes for the same assumed areas of the diaphragms 33 and 31. Thus it is seen that when the hand valve is operated, the differential valve causes a greater air pressure to be employed to actuate the trailer brakes than the tractor brakes. The trailer brakes will also be applied slightly before the tractor brakes since air under pressure is free to flow directly to the power cylinder 7, whereas the air flowing to the tractor power cylinder 6 must first unseat the end of tube 35. By applying the trailer brakes before the tractor brakes and by a greater pressure than the tractor brakes, a braking condition results which is very desirable in preventing the trailer from jackknifing. There will be no tendency whatever of the trailer to overrun the tractor.

In prior tractor trailer braking systems the hand valve is employed to control only the trailer brakes. This method of operation is very undesirable since the operator of the vehicle has a tendency to use the hand valve to the exclusion of the foot valve under all braking operations. This, of course, results in the wearing out of the trailer brakes much faster than the tractor brakes and a time will arrive when the operator finally becomes aware of the fact that he has no brakes on his trailer regardless of whether he uses the hand valve or the foot valve which latter valve controls the brakes on both vehicles. With the air pressure actuating system just described there is no possibility of the operator of the vehicle employing the trailer brakes to the exclusion of the tractor brakes by the use of the hand valve only. Whenever the hand valve is used to prevent trailer jackknifing or to snub the trailer brakes on long grades to prevent overrunning, the tractor brakes will also be applied but not with as great a pressure as the trailer brakes. The ratio between the air pressures actuating the trailer and tractor brakes will always be the same, such ratio being determined by the ratio between the areas of the two diaphragms 33 and 31. Thus the operator of the tractor trailer combination can never, by using the hand valve exclusively, wear only the trailer brakes as the tractor brakes must also be used.

When the hand valve is released to exhaust the air in power cylinders 6 and 7, the air in the trailer power cylinder will flow directly back through pipes 27, 25 and 38 and the air from the tractor power cylinder 6 will flow back through pipes 26, 24, 39, the check valve 40, and pipe 38. Although the pressure applied to the two power cylinders always has constant ratio, the air pressure is not exhausted in this ratio due to the by-pass connection pipe 39.

In Figure 2 I have shown a slight modification of the differential valve whereby different results can be obtained if such are desired. As shown in this figure, the tube 35 is provided with a small hole 41 between chamber 34 and the interior of the tube. With this hole in the tube the differential valve will act in the same manner as previously described whenever the hand valve is opened to initially apply the trailer and tractor brakes. However, after the brakes have been initially applied and the hand valve held open, the ratio between the air pressures in the two power cylinders will not be maintained since after the lower end of tube 35 engages seat 36, air under pressure will leak through hole 41 until the pressures in the power cylinders are equalized. Thus if twenty pounds per square inch of pressure should be initially admitted to the trailer power cylinder by the hand valve, the initial air pressure effective in the tractor power cylinder 6 would be ten pounds, the ratio between the diaphragm areas still being considered as 1 to 2. However, this pressure would slowly increase due to the leak through hole 41 until the pressure was twenty pounds. If an additional pressure, say for example, ten pounds were placed in the trailer power cylinder by an additional opening of the hand valve, tube 35 would not be unseated since due to the ratios between the areas of the two diaphragms, this increase in pressure would be insufficient to perform the unseating operation. The air pressure acting on the tractor brakes would slowly increase due to the leak hole 41 until the pressure reached the same as that acting on the trailer brakes, namely, thirty pounds per square inch.

If the hand valve is used to snub the trailer brakes for a long period of time, the tractor brakes will also be employed and the pressure acting on them will be as great as on the trailer brakes after the air pressures have sufficient time to equalize due to the leak hole 41. The proper sequence of operation of the brakes will, however, always be present since the trailer brakes will be applied before the tractor brakes and with a greater pressure. Thus there is no chance of the vehicle jackknifing or the trailer having a tendency to over-run the tractor.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure braking system operated by differential fluid pressures, a plurality of brakes, a power cylinder for actuating some of the brakes, a second power cylinder for actuating other of said brakes, a source of pressure different from atmosphere, means including operator-operated control means for causing equal fluid pressures from said source to be effective in said cylinders, and other means including a second operator-operated control means and a differential valve means associated with one cylinder for causing different fluid pressures to be effective in said cylinders when the source is connected thereto by said second control means, said second control means being no part of the means for causing the equal pressures to be effective in said cylinders.

2. In a fluid pressure braking system operated by differential fluid pressures, a plurality of brakes, a power cylinder for actuating some of the brakes, a second power cylinder for actuating other of said brakes, a source of pressure different from atmosphere, means including operator-operated control means for causing equal fluid pressures from said source to be effective in said cylinders, other means including a second operator-operated control means and a differential valve means associated with one cylinder for causing different fluid pressures to be effective in said cylinders when the source is connected thereto by said second control means, said second control means being no part of the means for causing the equal pressures to be effective in said cylinders, and a by-pass passage of small cross-sectional area around the differential valve for causing the different fluid pressures to equalize when the said second control means is operative for a period of time.

3. In a fluid pressure brake actuating system, a plurality of brakes, a power cylinder for actuating some of the brakes, a second power cylinder for actuating other of said brakes, a source of fluid pressure, means including operator-operated control means for causing equal fluid pressures to be effective in said cylinders, and other means including a second operator-operated control means independent of the first named control means and a differential valve means for causing different fluid pressures to be effective in said cylinders, said second control means being no part of the means for causing the equal pressures to be effective in said cylinders.

4. In a fluid pressure brake actuating system, a plurality of brakes, a power cylinder for actuating some of the brakes, a second power cylinder for actuating other of said brakes, a source of fluid pressure, means including operator-operated control means for causing equal fluid pressures to be effective in said cylinders, other means including a second operator-operated control means independent of the first named control means and a differential valve means for causing different fluid pressures to be effective in said cylinders when the said second operator-operated control means is initially operated to admit a predetermined fluid pressure from the source, and by-pass means associated with the differential valve means for causing the different fluid pressures to equalize if the fluid pressure admitted by the second control means is sustained for a period of time, said second control means being no part of the means for causing the equal pressures to be effective in said cylinders.

5. In a fluid pressure braking system, brakes, a power cylinder for applying some of the brakes, a power cylinder for applying other of the brakes, a source of fluid pressure, means comprising one control valve for applying equal fluid pressures to both of said power cylinders, means comprising a second independently operated control valve and a differential valve for applying different fluid pressures to said power cylinders, and means for preventing communication between the cylinders and either control valve when the other control valve is operated.

6. In a fluid pressure braking system, brakes, a power cylinder for applying some of the brakes, a power cylinder for applying other of the brakes, a source of fluid pressure, means comprising a foot-operated control valve for applying equal fluid pressures to both of said power cylinders, and means comprising a hand-operated control valve and a differential valve associated with one power cylinder for applying different fluid pressures to said power cylinders.

7. In a fluid pressure braking system, brakes, a power cylinder for applying some of the brakes, a power cylinder for applying other of the brakes, a source of fluid pressure, means comprising one control valve for applying equal fluid pressures to both of said power cylinders, and means comprising a second independently operated control valve and a differential valve associated with one power cylinder for applying different fluid pressures to said power cylinders, said differential valve causing the different fluid pressures to have a fixed ratio therebetween for any fluid pressure admitted by the second control valve.

8. In a fluid pressure braking system, brakes, a power cylinder for applying some of the brakes, a power cylinder for applying other of the brakes, a source of fluid pressure, means comprising one control valve for applying equal fluid pressures to both of said power cylinders, means comprising a second independently operated control valve and a differential valve associated with one power cylinder for applying different fluid pressures to said power cylinder, and a by-pass means for said differential valve for causing the different pressures to equalize when the fluid under pressure admitted by the second control valve is sustained for a period of time.

9. In a fluid pressure braking system, brakes, a power cylinder for applying some of the brakes, a power cylinder for applying other of the brakes, a source of fluid pressure, means comprising one control valve for applying equal fluid pressures to both of said power cylinders, means comprising a second independently operated control valve and a differential valve associated with one power cylinder for applying different fluid pressures to said power cylinders, and means including a by-pass around the differential valve and a check valve in the by-pass for permitting fluid to be exhausted from the cylinder with which the differential valve is associated.

10. In a fluid pressure braking system, brakes, means comprising a power cylinder for applying some of the brakes, means comprising a second power cylinder for applying other of the brakes, and means for so controlling the application of fluid pressure to the power cylinders that either equal fluid pressures are effective in both cylinders or different fluid pressures are effective in said cylinders, said means comprising an operator-operated valve for admitting equal fluid pressures to the cylinders and other means comprising an independently operated operator-operated valve and a differential valve associated with one cylinder only for causing different fluid pressures to be effective in the power cylinders.

11. In a fluid pressure brake actuating system, a plurality of brakes, means for actuating said brakes including two fluid motors, a source of pressure, conduit means for connecting said source to both motors, a control valve in said conduit means for applying equal pressures to the fluid motors, means comprising other conduit means for connecting the source to both fluid motors, a control valve in said conduit means for admitting fluid pressure to said fluid motors independently of the first named valve, and means interposed in the conduit means between said last named valve and one of the fluid motors for causing the fluid pressure admitted to said fluid motor to be different than that admitted to the other fluid motor when the said last named valve is operated.

12. In a fluid pressure brake actuating system, a plurality of brakes, means for actuating said brakes including two fluid motors, a source of pressure, conduit means for connecting said source to both motors, a control valve in said conduit means for applying equal pressures to the fluid motors, means comprising other conduit means for connecting the source to both fluid motors, a control valve in said conduit means for admitting fluid pressure to said fluid motors independently of the first named valve, and means interposed in the conduit means between said last named valve and one of the fluid motors for causing the fluid pressure admitted to said fluid motor to be different than that admitted to the other fluid motor when the said last named valve is initially operated, said last named means embodying means for permitting the different fluid pressures to be equalized when the last named valve causes fluid under pressure to be effective in the cylinders for a period of time.

13. In a fluid pressure braking system, brakes, means comprising a power cylinder for applying some of the brakes and a second power cylinder for applying other of the brakes, a source of fluid pressure, and means for controlling the application of fluid pressure to the power cylinders so that either equal fluid pressures are effective in both cylinders or different fluid pressures are effective in the cylinders, said means comprising one operator-operated control valve and conduit means for admitting equal fluid pressures to both cylinders, a second and independently operated operator-operated control valve and conduit means for admitting pressure to both of said cylinders, and valve means interposed between said last named operator-operated valve and one cylinder for causing the fluid pressure effective in said cylinder to be different than that effective in the other cylinder, said last named valve means comprising control means embodying two members having different areas, one of which is exposed to the fluid pressure effective in one cylinder and the other of which is exposed to the fluid pressure effective in the other cylinder.

14. In a fluid pressure braking system for a tractor trailer vehicle, brakes on both vehicles, a power cylinder for applying the trailer brakes, a power cylinder for applying the tractor brakes, a source of fluid pressure different from atmosphere, means comprising a foot-operated control valve for causing equal differential fluid pressures to be effective in both power cylinders, and means comprising a hand-operated valve and a differential valve for causing different differential fluid pressures to be effective in said power cylinders, said hand-operated valve being no part of the means for causing equal differential fluid pressures to be effective in both power cylinders.

15. In a fluid pressure braking system for a tractor trailer vehicle, brakes on both vehicles, a power cylinder for applying the trailer brakes, a power cylinder for applying the tractor brakes, a source of fluid pressure, means comprising a foot-operated control valve for applying equal differential fluid pressures to actuate both power cylinders, means comprising a hand-operated valve and a differential valve for applying different differential fluid pressures to actuate said power cylinders, and by-pass means for said differential valve for causing the different fluid pressures to equalize if the fluid pressure applied through said hand valve is sustained for a period of time.

16. In a fluid pressure braking system for a tractor trailer vehicle, brakes on the vehicles, a power cylinder for applying the trailer brakes, a power cylinder for applying the tractor brakes, a source of fluid pressure, means comprising a foot-operated control valve for applying equal fluid pressures to both power cylinders, and means comprising a hand-operated valve and a differential valve for applying different fluid pressures to said power cylinders, said differential valve being interposed between the hand valve and the power cylinders of the tractor and causing the fluid pressure effective in the tractor power cylinder to be less than that in the trailer power cylinder and the two fluid pressures to have a fixed ratio.

17. In a fluid pressure braking system for a tractor trailer vehicle, brakes on the tractor, brakes on the trailer, a power cylinder for actuating the tractor brakes, a power cylinder for actuating the trailer brakes, a source of fluid pressure, conduit means for connecting the source to both power cylinders, a foot valve for controlling the application of equal pressures to both power cylinders from the source, means comprising two conduit means for connecting the source to the power cylinders independently of the foot valve, one of said conduit means leading to one power cylinder and the other to the other power cylinder, a hand valve for controlling the application of fluid pressure to the power cylinders through both conduit means, and valve means in the conduit means leading to the tractor power cylinder for causing a smaller fluid pressure to be effective in said cylinder than in the trailer power cylinder when the hand valve is opened.

18. In a fluid pressure braking system, two actuating power cylinders, a source of operator-controlled fluid pressure, conduit means for connecting the source to the cylinders, and a differential valve means associated with the conduit means of one cylinder for causing less fluid pressure to be effective therein than in the other cylinder when fluid pressure is transmitted from the source, said valve means comprising a normally closed valve element, and means for controlling the valve element including movable members connected to the valve element, one of said members having an area exposed to the fluid pressure effective on said one cylinder and tending to seat the valve element and the other a smaller area exposed to the fluid pressure transmitted from the source and tending to open the valve element, said members being so arranged that the forces resulting from the pressures acting on said areas are opposed to each other.

19. In a fluid pressure braking system, two actuating power cylinders, a source of operator-controlled fluid pressure, conduit means for connecting the source to the cylinders, and a differential valve means associated with the conduit means of one cylinder for causing less fluid pressure to be effective therein than in the other cylinder when fluid pressure is transmitted from the source, said valve means comprising a normally closed valve element, means for controlling the valve element including movable members connected to the valve element, one of said members having an area exposed to the fluid pressure effective on said one cylinder and tending to seat the valve element and the other a smaller area exposed to the fluid pressure transmitted from the source and tending to open the valve element, said members being so arranged that the forces resulting from the pressures acting on said areas are opposed to each other, and means forming a small passage permitting fluid to flow around said valve element when closed.

20. In a fluid pressure braking system, two actuating power cylinders, a source of operator-controlled fluid pressure, conduit means for connecting the source to the cylinders and a differential valve means associated with the conduit means of one cylinder for causing less fluid pressure to be effective therein than in the other cylinder when fluid pressure is transmitted from the source, said valve means comprising a normally closed valve element, means for controlling the valve element including movable members connected to the valve element, one of said members having an area exposed to the fluid pressure effective on said one cylinder and tending to seat the valve element and the other a smaller area exposed to the fluid pressure transmitted from the source and tending to open the valve element, said members being so arranged that the forces resulting from the pressures acting on said areas are opposed to each other, a by-pass around said valve, and a check valve for permitting fluid under pressure to flow only through the by-pass from said cylinder.

WALTER R. FREEMAN.